United States Patent
Nemoto

[19]

[11] Patent Number: 5,927,813
[45] Date of Patent: Jul. 27, 1999

[54] ARRANGEMENT OF HEADREST STAY HOLDER AND HOLDER BRACKET IN VEHICLES SEAT

[75] Inventor: Akira Nemoto, Akishima, Japan

[73] Assignee: Tachi-S Co., Ltd., Tokyo, Japan

[21] Appl. No.: 09/019,498

[22] Filed: Feb. 5, 1998

[51] Int. Cl.[6] ................................................ A47C 7/00
[52] U.S. Cl. ..................... 297/391; 297/410; 297/463.1
[58] Field of Search ................................. 297/391, 410, 297/463.1, 463.2; 403/326, 329

[56] References Cited

U.S. PATENT DOCUMENTS

| | | | |
|---|---|---|---|
| 4,411,470 | 10/1983 | Nishimura et al. | 297/410 |
| 4,483,565 | 11/1984 | Terui et al. | 297/410 |
| 4,545,618 | 10/1985 | Kitamura | 297/410 |
| 4,639,041 | 1/1987 | Furukawa | 297/391 |
| 4,854,642 | 8/1989 | Vidwans et al. | 297/391 |
| 5,445,434 | 8/1995 | Kohut . | |

FOREIGN PATENT DOCUMENTS

| | | |
|---|---|---|
| 61-163551 | 10/1986 | Japan . |
| 9140504 | 6/1997 | Japan . |
| 9238772 | 9/1997 | Japan . |
| 9238773 | 9/1997 | Japan . |

Primary Examiner—Anthony D. Barfield
Attorney, Agent, or Firm—Browdy and Neimark

[57] ABSTRACT

In the combination of headrest stay holder and holder bracket for use with a vehicle seat, an improved arrangement is provided, which comprises a force accessible part defined in the headrest stay holder, a releasable rotation-preventive part defined between the headrest stay holder and holder bracket, and a disengagement guide part defined between the holder and a lower end of the bracket. Normally, under a resistance of the releasable rotation-preventive part, a pair of hook-like end parts of the headrest stay holder are engaged with an engagement end portion of the holder bracket, but a great force of rotation can be accessed and applied via the force accessible part, using a wrench or the like, to that holder, sufficient to overcome the resistance, so as to disengage the two hook-like end parts from the holder bracket lower end via the disengagement guide part. In this way, the headrest stay holder can easily be removed from the holder bracket, without troublesome and dangerous processes.

19 Claims, 8 Drawing Sheets

ARRANGEMENT OF HEADREST STAY HOLDER AND HOLDER BRACKET IN VEHICLES SEAT

BACKGROUND OF INVENTION

1. Field of the Invention

The present invention relates to an arrangement of headrest stay holder and holder bracket in a vehicle seat, the holder bracket being adapted to receive and support the headrest stay holder therein. More particularly, the present invention is directed to an arrangement of headrest stay holder and holder bracket in the top of a seat back of the vehicle seat, which allows the headrest stay holder to be securely supported in and easily removed from the holder bracket.

2. Description of Prior Art

In general, a vehicle or automotive seat is provided with a headrest having a pair of rod-like headrest stays projected downwardly therefrom, and the headrest is securely mounted on the top of seat back of that seat, such that its pair of headrest stays are inserted in two headrest stay holders embedded in the seat back, respectively.

As typically disclosed in the Japanese Laid-Open Utility Model Pub. No. 61-163551, a pair of headrest stay holders of this kind are fixed in a part of seat back frame within a seat back of automotive seat and are each of a locking structure for allowing each of two stays of headrest to be inserted and locked therein. The headrest stay holders represented in this manner are more or less formed from a synthetic resin material in a generally "T" shape in the longitudinal section, having a head portion great in diameter relative to the tubular body thereof, wherein the tubular body is dimensioned to receive the headrest stay therein and has a split lower end portion defined by a pair of opposed slit-like notches, so that the split lower end portion can be elastically collapsed. This split lower end portion is formed with a pair of downwardly tapered anchor pieces. According to this prior art, the seat frame has a hole slightly greater in diameter than the tubular body of headrest stay holder. Hence, in assembly, when inserting the headrest stay holder into such hole of seat frame, its split end portion is resiliently collapsed within the tubular body of holder, making thus small a total diameter thereof including its two anchor pieces, relative to the inner diameter of the hole. In that way, the whole tubular body of headrest stay holder can be slid through the hole. Then, a worker in this assembly continues to insert on the tubular body in the hole until its split end portion and anchor pieces project from the opposite side of hole to the inside of seat back, whereby the split end portion recovers its normal diameter from the collapsed state to expand the anchor pieces outwardly beyond the diameter of hole, thereby locking the headrest stay holders in the hole against removal therefrom.

Recent days witness a recycle tendency in many manufacturers to reuse industrial waste materials for further production purposes. The same goes for the vehicle seat production circles, and it has become necessary to take apart the seat into some reusable elements before disposal. This recycle tendency therefore requires a seat that can be easily disassembled to obtain reusable elements with minimized damages.

The above-stated structure of headrest stay holders certainly meets this recycle demand, as the split end portion as well as its associated anchor pieces of the holder can be elastically contracted to a diameter smaller than the hole of seat frame, and thus, the holder itself can be removed from the hole for reuse purpose.

However, in a practical seat disassembling process, a worker encounters the difficulty for access to the elastic split end portion of headrest stay holder which is located within the seat back. This means that the worker must tear and destroy a corresponding part of the upholding layers of seat (which comprises a trim cover assembly, a foam padding layer and other layers) to create an opening therein, and then reach his or her hand via such opening to the split end portion of headrest stay holder in order to unlock the holder from the seat frame. At this step, the worker inevitably suffers from time-consuming, troublesome or dangerous labors, in that he or she must feel out and contract the holder end portion with his or her hand, in an invisible manner, which will result in an inaccurate removal of the holders, giving a damage thereto, and may involve a highly potential danger to the worker's hand, and in that he or she must apply an extraordinary strong force, with the fingers, to the holder end portion in an effort to contract the same, which may involve an undesired fatigue problem and make slow the disassebling work, and also involve a physical damage problem, as well.

SUMMARY OF THE INVENTION

In view of the above-stated drawbacks, it is a primary purpose of the present invention to provide an improved arrangement of headrest stay holder and holder bracket for use with a vehicle seat, which permits for easy removal of the headrest stay holder from the holder bracket.

In order to achieve such purpose, based on the combination of headrest stay holder and holder bracket wherein the holder bracket is to be fixedly provided in the vehicle seat and the headrest stay holder is removably supported in the holder bracket, the headrest stay holder being of such type that includes a generally tubular body for receiving a stay of a headrest therein and an elastic split lower end portion having, formed therein, a pair of slit-like notches and a pair of hook-like end parts, and wherein the headrest stay holder is normally locked in the holder bracket, with the two of hook-like end parts thereof engaged with an engagement end portion of the holder bracket, but removable therefrom by contracting those two hook-like end parts elastically to a size smaller than that of the holder bracket for disengagement therefrom, in accordance with the present invention, there is basically provided an arrangement comprising:

a force accessible means for making accessible a force of rotation to the headrest stay holder and allowing the force of rotation to be applied thereto in an amplified way, which force accessible means is defined in the headrest stay holder;

a releasable rotation-preventive means which normally provides a resistance between the headrest stay holder and holder bracket so as to provide a rotation-preventive action for preventing the headrest stay holder against rotation in and relative to the holder bracket, but permits the releasable rotation-preventive means per se to be released from such rotation-preventive action by application of the force of rotation thereto sufficient to overcome the resistance via the force accessible means, which rotation-preventive means is defined between the headrest stay holder and holder bracket;

and a disengagement guide means by which the pair of hook-like end parts of headrest stay holder may be so guided as to be elastically contracted to a size smaller than the holder bracket and displaced in a direction out of engagement with the engagement end portion of holder bracket as the headrest stay holder is rotated in the holder bracket by the force of rotation.

With this arrangement, when the force of rotation is applied via the force accessible means to the headrest stay holder sufficient to overcome the resistance of releasable rotation-preventive means, the headrest stay holder is rotated in the holder bracket, with the releasable rotation-preventive means being released from the foregoing rotation-preventive action, so that continued rotation of the headrest stay holder under the force of rotation by a predetermined degree of angle relative to the holder bracket causes elastic contraction of both two hook-like end parts of headrest stay holder for entry into the holder bracket via the disengagement guide means and also causes simultaneous displacement, via the disengagement guide means, of the same two hook-like end parts out of engagement with the engagement end portion of holder bracket, thus allowing the headrest stay holder to be removed from the holder bracket.

Preferably, the force accessible means may comprise a non-circular portion formed in an upper end portion of the headrest stay holder adjacent the top of the seat, which non-circular portion is of a shape suited to be gripped firmly by a tool of type capable of gripping the non-circular portion and applying an amplified force of rotation via said non-circular portion to said headrest stay holder sufficient to overcome the resistance of releasable rotation-preventive means.

The releasable rotation-preventive means may include a stopper means provided in the headrest stay holder and a notch means provided in said holder bracket, in such a manner that the stopper means is normally engaged with the notch means, with the above-stated resistance, such as to prevent rotation of said headrest stay holder in said holder bracket, but releasable from engagement with said notch means by application of the force of rotation via said force accessible means to said headrest stay holder. Preferably, the stopper means may have a certain amount of the afore-stated resistance but also have a deformable or breakable property relative to said notch means by application of the force of rotation sufficient to overcome such resistance of stopper means, in order to release the releasable rotation-preventive means per se from the foregoing rotation-preventive action. Or, alternatively, the notch means may be formed to extend peripherally of the holder bracket, while leaving a vertically extending and relatively small notch area therein, so that the stopper means is normally engaged in such relatively small notch area to provide the rotation-preventive action, but may ride over that small notch area for releasing the action by application of the rotation force.

The disengagement guide means may include a first means for causing said pair of hook-like end parts to be elastically contracted to a size smaller than the holder bracket and guiding those hook-like end parts in a direction out of engagement with the engagement end portion of holder bracket when the force of rotation is applied via the force accessible means to the headrest stay holder by the predetermined degree of angle, and a second means for allowing those two hook-like end parts to be engaged with the engagement end portion when the headrest stay holder is normally secured in said holder bracket. Preferably, a generally elongated circular guide piece or skirt portion may be used to serve as the first and second means of this disengagement guide means.

In another alternative aspect of the invention, the first means of disengagement guide means may comprise: a fulcrum point active to the stopper means, the fulcrum point being defined between the foregoing peripherally-extending notch means and relatively small notch area; an angular moment applying point which is active to one of the paired hook-like end parts of headrest stay holder; and a disengagement guide point where the two hook-like end parts are guided and disengaged from the engagement end portion of holder bracket, the disengagement guide point being defined between the two hook-like end parts and the engagement end portion such as to allow smooth sliding and guiding of those hook-like end parts along the engagement end portion into within the holder bracket, wherein the fulcrum point is located in a torsional relation with the angular moment applying point. Thus, when the stopper means is forcibly abutted against the fulcrum point and displaced upwardly relative to the fulcrum point, out of engagement with the relatively small notch area, by application of the force of rotation to the headrest stay holder, the angular moment applying point is created between the foregoing one of two hook-like end parts and the engagement end portion, whereby an inward force component is produced and applied to said one of said pair of hook-like end parts, thereby contracting it inwardly of said headrest stay holder out of engagement with said engagement end portion of the holder bracket, which in turn guides both said pair of hook-like end parts, via said disengagement guide point, into within said holder bracket.

Any other features and advantages of the present invention will become apparent from reading of the descriptions hereinafter, with reference to the annexed drawings.

DETAILED DESCRIPTION OF PREFERRED EMBODIMENTS OF THE INVENTION

Referring to FIGS. 1 through 29, there are illustrated novel arrangements of headrest stay holder and its associated holder bracket in a vehicle or automotive seat, in accordance with the present invention.

While showing several slightly different modes of the present invention in all the drawings, it should be firstly understood that the present invention aims to provide a simplified unique means applicable to the conventional structure of headrest stay holder and holder bracket, within its generic inventive concept in common with those modes, for the purpose of allowing an easy removal of a headrest stay holder (see numeral (12)) from a holder bracket (see numeral (10)).

Hence, in the present invention, generic designations (A), (B) and (C) given throughout the figures represent principal means to realize the foregoing purpose; namely, a force accessible means (A) is defined in the neck of the headrest stay holder (12), a releasable rotation-preventive means (B) is provided between the headrest stay holder (12) and holder bracket (11), and a disengagement guide means (C) is defined between the lower end portion of headrest stay holder (12) and the holder bracket (11). Details of these inventive points will become apparent from the descriptions hereinafter.

Figure 15:
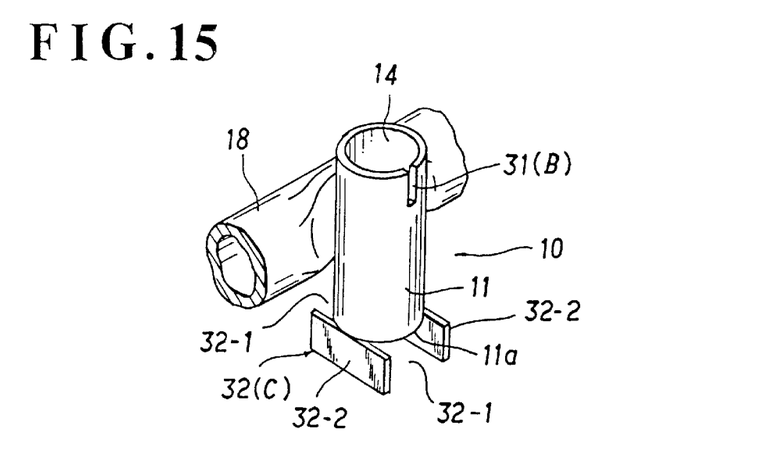
FIG. 15 is a partly broken perspective view showing an alternative mode of disengagement guide element in the first mode.
Figure 16:
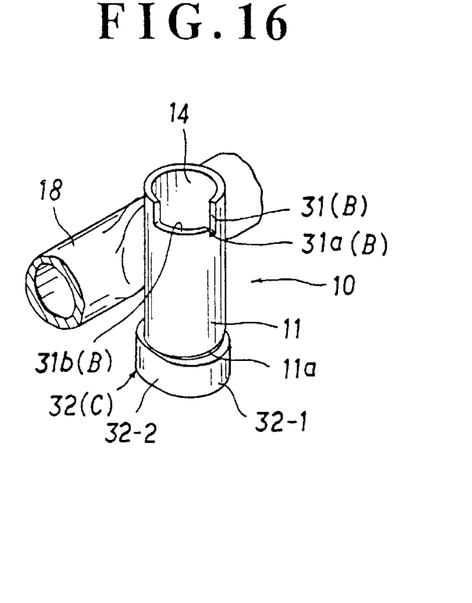
FIG. 16 is a partly broken perspective view of a second mode of the arrangement in accordance with the invention.
Figure 17:
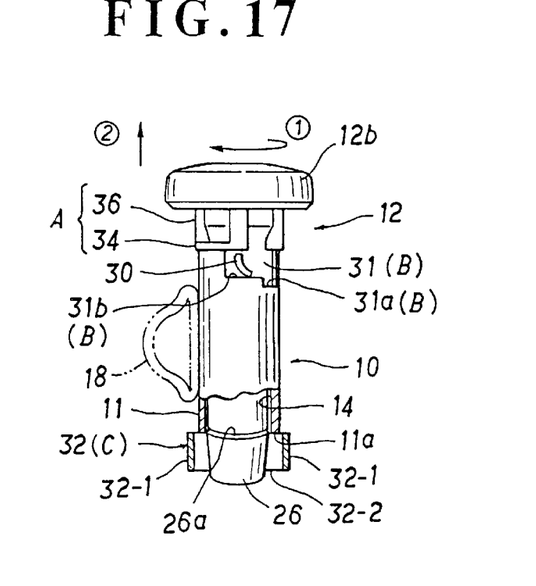
FIG. 17 is a diagram in connection with FIG. 16, which explanatorily shows how the headrest stay holder is removed from the holder bracket.
Figure 26:
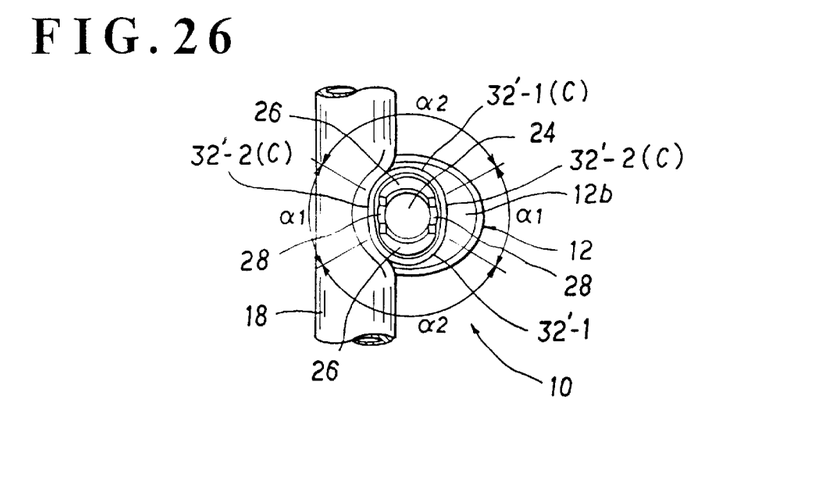
FIG. 26 is a partly broken bottom view of the third mode in the unlocked state.
Figure 27:
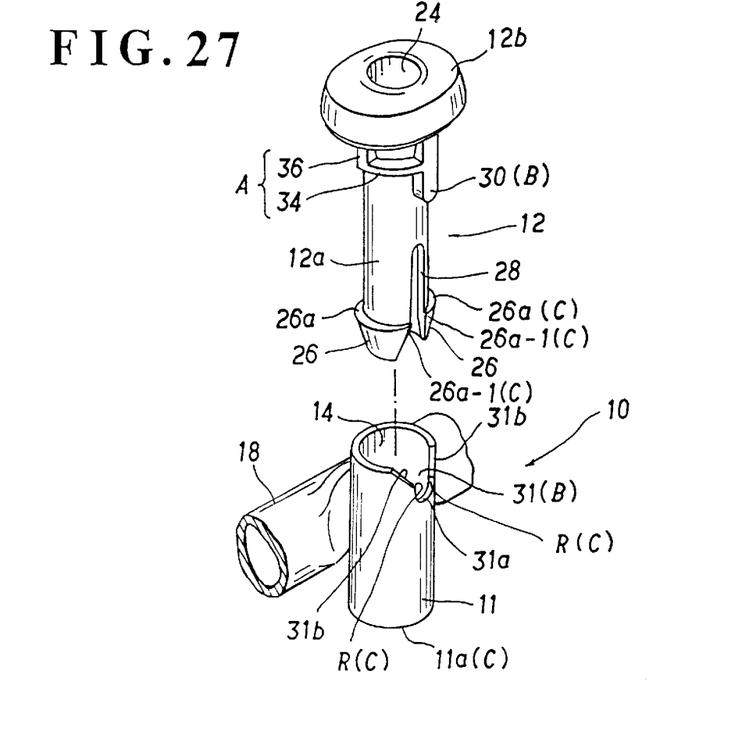
FIG. 27 is a partly broken, schematic perspective view of a fourth alternative mode of the arrangement.
Figure 28:
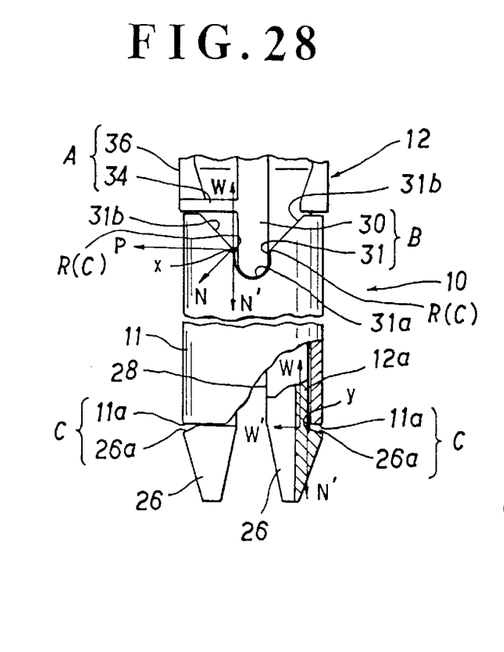
FIG. 28 is a fragmentary diagram showing a dynamical relation among the associated parts in the fourth mode.
Figure 29:
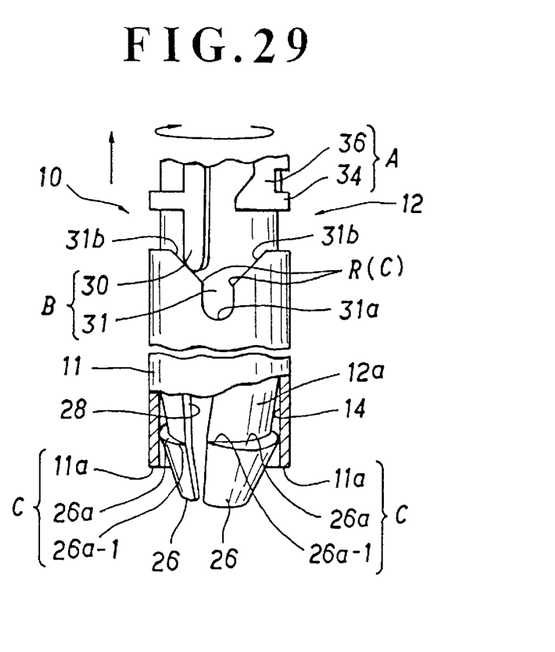
FIG. 29 is a fragmentary diagram showing how the headrest stay holder is removed from the holder bracket.

In this connection, viewing of the drawings indicates that one exemplary embodiment of the invention is shown in FIGS. 2 to 12, with its slightly changed embodiments shown in FIGS. 15, 16 and 17, whereas two another alternative embodiments are shown in one set of FIGS. 18 to 26 and another set of FIGS. 27 to 29, respectively. Any of these embodiments are suggested only by way of example as non-distinctive modes to embody the generic principal means designated by (A), (B) and (C). Thus, all the illustrated embodiments are not limitative, and any other changes and modifications may be effected within the scope of the present invention.

Figure 1:
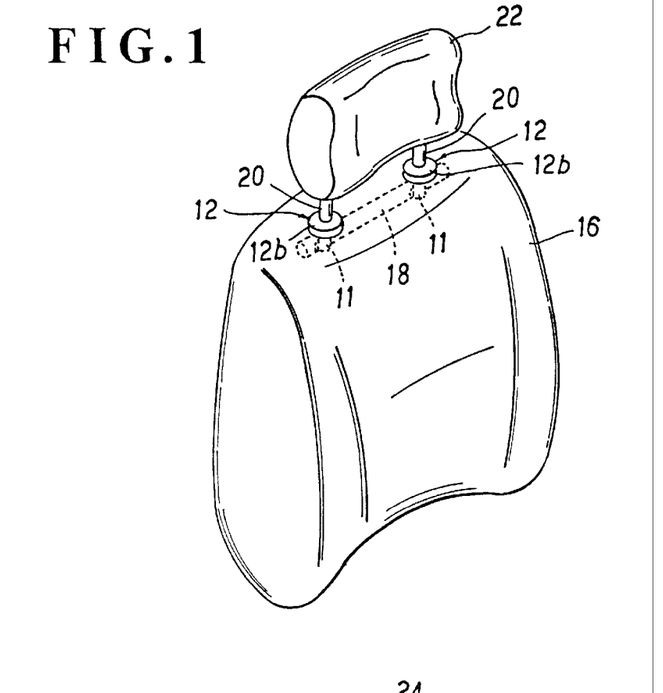
FIG. 1 is a schematic perspective view of a seat back of a vehicle seat to which is applied an arrangement of headrest stay holder and holder bracket in accordance with the present invention.
Figure 4:
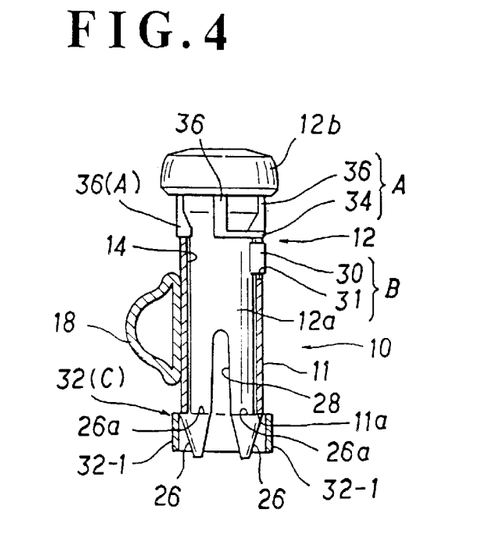
FIG. 4 is a partially sectioned side view of the first mode of arrangement in the locked state.
Figure 5:
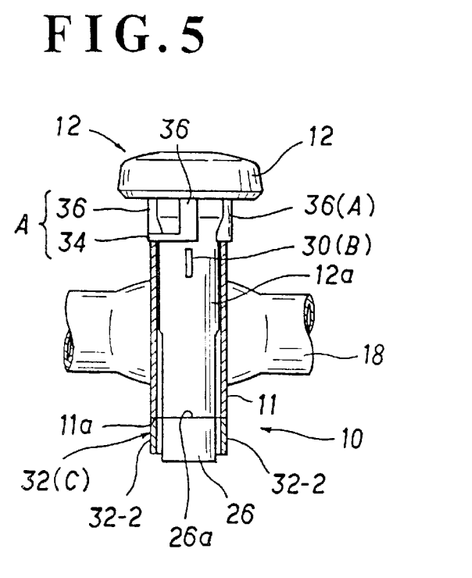
FIG. 5 is a partially sectioned front view of the first mode in the locked state.
Figure 9:
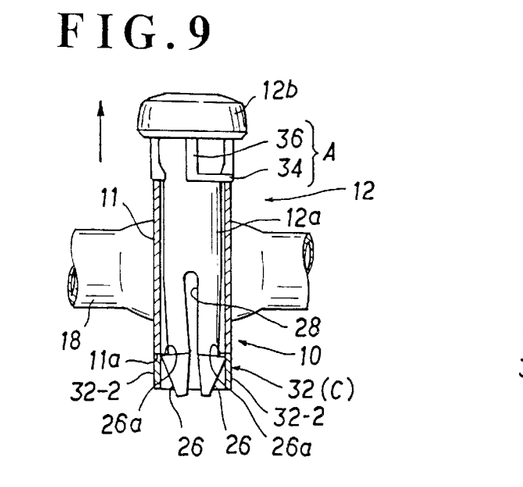
FIG. 9 is a partially sectioned front view of the first mode in the unlocked state.

Now, FIG. 1 shows the arrangement of headrest stay holder and holder bracket in accordance with the present invention, which is provided on a seat back (16) of a vehicle or automotive seat. As known in the art, the headrest stay holder (12) itself is formed from a synthetic resin material in the generally "T" shape comprising a generally circular head portion (12b) and a tubular body portion (12a) extending therefrom. A through-bore (24) is formed in both head and tubular body portions (12b)(12a) to permit insertion of a headrest stay (20) of headrest (22) therethrough. As seen in FIGS. 4 and 9, the tubular body portion (12a) has a split lower end portion which is elastically collapsible in the diametric direction by way of a pair of slit-like notches (28) formed on the opposite sides of tubular body portion, and also has a pair of downwardly tapered hook end parts (26)(26) which are spaced from each other by such two notches (28). On the other hand, the holder bracket (10) itself is also of a known stiff metallic cylindrical bracket type welded fast to a seat back frame (18) within the seat back (16) as shown in the phantom lines in FIG. 1., comprising a cylindrical body (11) and an inner circular wall (14) adapted to receive and support therein the tubular body portion (12a) of headrest stay holder (12).

With this known structure only in view, the headrest stay holder (12) may be merely inserted in the holder bracket (10) while elastically collapsing the split end portions of headrest stay holder tubular body (10) diameter-wise within the cylindrical body (11) of holder bracket (10) until the two hook end parts (26) project from the lower end of holder bracket (10) and elastically expand outwardly there to lock the headrest stay holder (12) against removal. This is merely the same structure and securing manner as in the previously described prior art, leaving the problem with difficulty of removing the headrest stay holder (12) from the bracket (10) in a seat disassembling process.

As stated earlier, to solve such problem, the present invention provides a novel arrangement of headrest stay holder and its associated holder bracket in the seat back, which includes the three principal means (A), (B) and (C) that can be defined in the known headrest holder and bracket structure. While both headrest stay holder (12) and holder bracket (10) are shown in FIG. 1 to be provided in pairs in the top of seat back (16), a description will be given only of one set of the headrest stay holder (12) and holder bracket (10) for the sake of simplicity, because of their structural identity.

Before starting to describe each of the illustrated modes, the above-noted generic principal concepts of the present invention, i.e. the force accessible means (A), the releasable rotation-preventive means (B) and the disengagement guide means (C), will be described in brief to facilitate the understanding of general whole arrangement and functions of the present invention. Namely, the force accessible means (A), defined in the juncture between the head portion (12b) and tubular body portion (12a), is intended to make accessible thereto such rotary force applying means as an adjustable wrench or a screwdriver thereto (see FIGS. 13 and 14), where a great force of rotation may be easily applied via the wrench or screwdriver to the headrest stay holder (12). The releasable rotation-preventive means (B), defined between the tubular body portion (12a) of headrest stay holder (12) and the bracket holder (10), functions to normally prevent the headrest stay holder (12) against rotation in the bracket holder (10), but permit the holder (12) to be rotated by applying a rotational force, via the wrench or screwdriver, enough to release this particular means (B) itself from the prevention of its rotation. The disengagement guide means (C), defined between the lower end portion of headrest stay holder (12) and the holder bracket (10), functions to guide the two hook end parts (26) of headrest stay holder (12) in a direction out of engagement with the lower end area of holder bracket (10). In summary, the three means (A), (B) and (C) are in a mutually cooperative or coactive relationship to achieve the purposes of the present invention, as will be appreciated commonly and concretely from the descriptions of each embodiment below.

Figure 10:
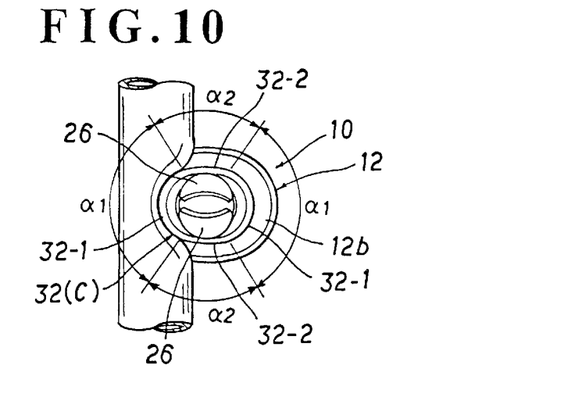
FIG. 10 is a partly broken bottom view of the first mode in the unlocked state.
Figure 11:
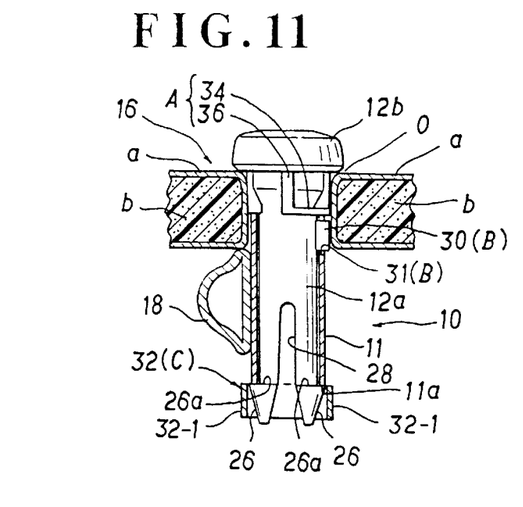
FIG. 11 is a fragmentary schematic diagram which generally shows the arrangement of the present invention to be attached in a seat back having an upholstery layer.
Figure 12:
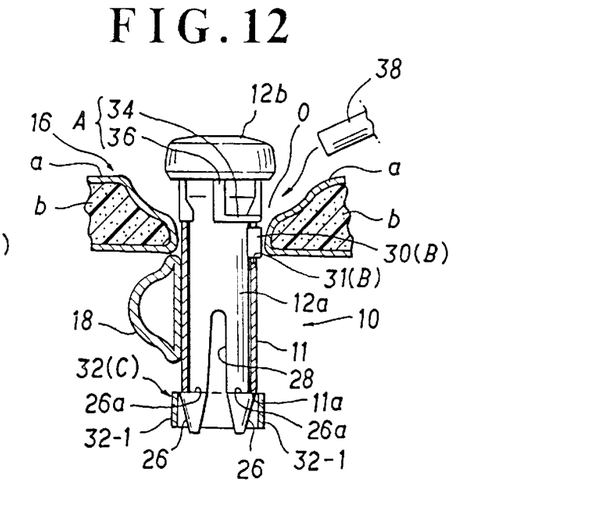
FIG. 12 is a diagram which explanatorily shows the state where a force accessible area of the headrest stay holder is exposed for access to an adjustable wrench.
Figure 13:
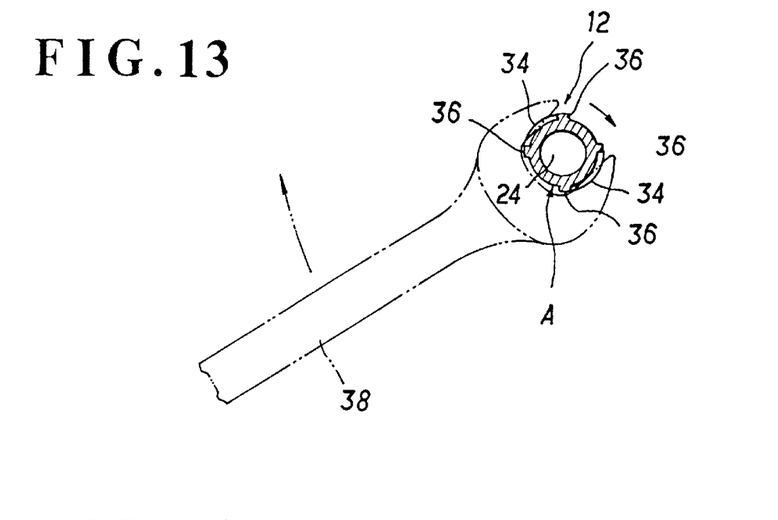
FIG. 13 is a diagram indicating a state where the headrest stay holder is rotated by the wrench to disengage it from the holder bracket.

Reference is now made to FIGS. 2 to 12, in which a first mode is suggested as to those principal means (A), (B) and (C). As shown, the force accessible means (A) may be embodied as a non-circular projection formed circumferentially of the headrest stay holder (12). More specifically, spacer projections (34) and uneven projections (36) are formed integrally about the peripheral wall of headrest stay holder tubular body portion (12a) at the neck or juncture area between the head and tubular body portions (12b)(12a) of headrest stay holder (12). Such projections (34)(36) shown here are formed by plural horizontal and vertical beam areas, respectively, providing an uneven peripheral surface suited to be gripped firmly by such rotary force applying means as the adjustable wrench (38). In practical use, as shown in FIGS. 11 and 12, this non-circular mode of force accessible means, i.e. the combination of spacer (34) and projections (36), is situated within a headrest stay hole (O) of upholding (a,b) of seat back (16) and thus invisible from the outside. But, as in FIG. 12, the headrest stay hole (O) and its surrounding area of seat back upholding (a,b) may be depressed elastically to expose such force accessible portion (34)(36), because the upholding includes an elastic foam padding (b) covered with a top cover layer (a), which is quite conventional, not to mention. With this arrangement, the wrench (38) or the like may easily be accessed to the headrest stay holder (12) so as to give it a great force of rotation.

Figure 2:
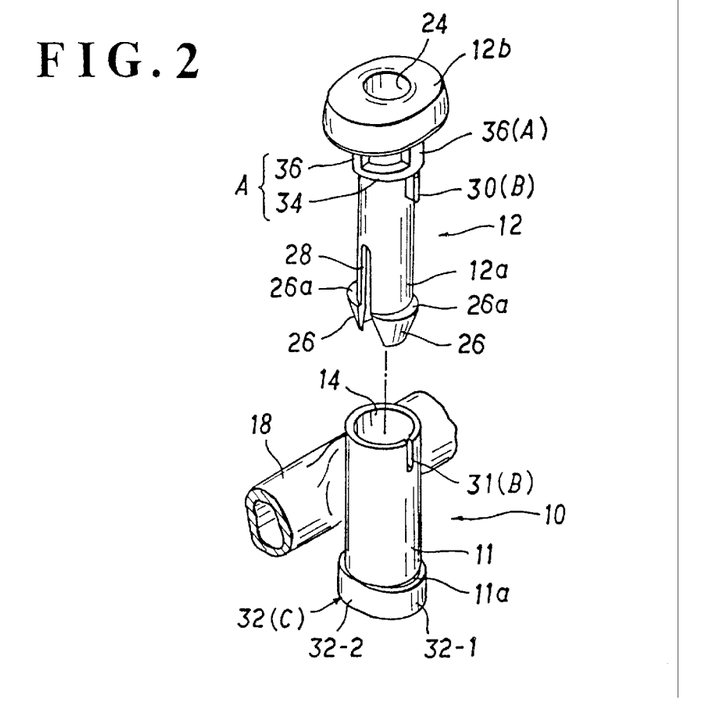
FIG. 2 is a partly broken, exploded schematic perspective view of a principal part of a first mode of the arrangement in accordance with the present invention.
Figure 3:
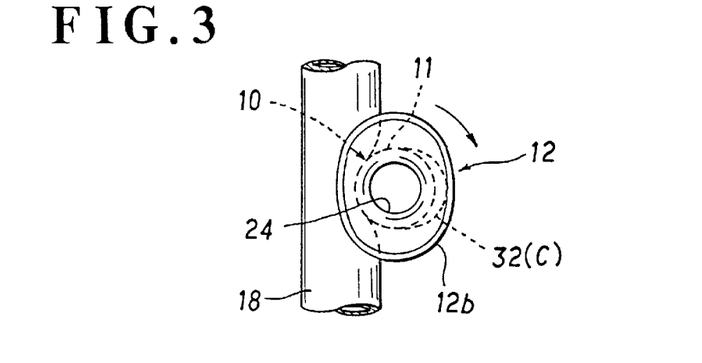
FIG. 3 is a partly broken plan view of the first mode of arrangement in accordance with the present invention, which shows a locked state where a headrest stay holder is engaged with a holder bracket.

In the present mode, the releasable rotation-preventive means (B) may be embodied by a vertical stopper piece (30) and a stopper engagement notch (31). The vertical stopper piece (30) is formed from a synthetic resin material same with that of headrest stay holder (12) and integral therewith at a point immediately below the the spacer (34), a part of the force accessible means (A), as shown in FIG. 2. This piece (30) projects outwardly from the peripheral surface of tubular body portion (12a) and extends vertically along the longitudinal direction thereof. The stopper engagement notch (31) is, on the other hand, formed in the upper end portion of holder bracket (10), extending vertically along the longitudinal direction of the same bracket. The size of this notch (31) is slightly greater than that of stopper piece (30), so that the latter is normally engaged in the former to prevent the headrest stay holder (12) against rotation within the holder bracket (10). In accordance with the present invention, the stopper piece (30) per se, as a part of the releasable rotation-preventive means (B), has a property of being releasable from engagement with the notch (31), for the purpose of allowing rotation of the headrest stay holder (12) in the holder bracket (10). Namely, the stopper piece (30) in this mode is provided with a certain rigid yet breakable property, such that it resists a force or load being externally imparted through the headrest stay (12) of headrest (22), but may be broken or cut off at the notch (31) by a great force of rotation given from the adjustable wrench (38), thereby allowing displacement of the stopper piece (30) from the notch (31). Stated briefly in this respect, applying a great force of rotation to the headrest stay holder (12) will overcome the resistance of stopper piece (30) to break and cut off it at the notch (31), thereby releasing the headrest stay holder (12) from the restriction of stopper piece (30) and thus permitting displacement of the stopper piece (30) out of the engagement with the notch (31), whereupon the headrest stay holder (12) can be rotated within the holder bracket (10). This will be explained more concretely later.

Figure 6:
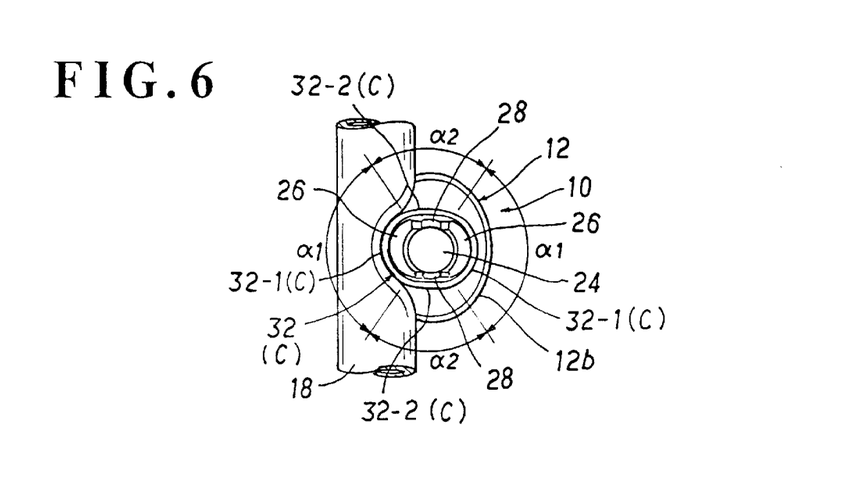
FIG. 6 is a partly broken bottom view of the first mode in the locked state.
Figure 7:
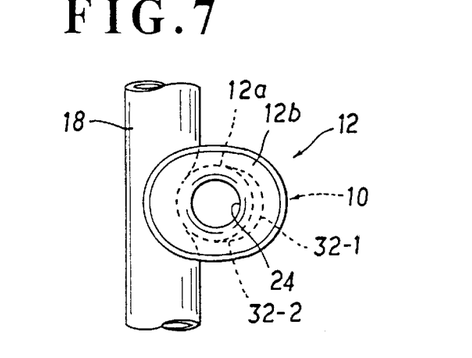
FIG. 7 is a partly broken plan view of the first mode, which shows an unlocked state where the headrest stay holder may be disengaged from the holder bracket.

The disengagement guide means (C) may be embodied as a generally elliptic or elongated circular shape of guide piece (32), which is formed from a metallic material, as seen in FIG. 2. As best shown in FIGS. 2 and 6, this guide piece (32) is fixed concentrically by welding to the circular lower end (11a) of holder bracket (10), and comprises a pair of disengagement guide sections (32-2)(32-2) and a pair of arcuate engagement areas (32-1)(32-1). The two disengagement guide sections (32-2)(32-2) face toward each other in the minor-axis direction of the generally elongated circular guide piece (32) to define a relatively narrow space equal to or smaller than the inner diameter of holder bracket (10). On the other hand, the two engagement areas (32-1)(32-1) are opposite to each other in the major-axis direction of the same guide piece (32), defining a relatively wide space equal to or larger than the outer diameter of the two crescent-like sheer engagement regions (26a)(26a) respectively of two hook end parts (26) of headrest stay holder (12). Hence, when the headrest stay holder (12) is securely set in the holder bracket (11), the engagement areas (32-1) of guide piece (32) provide a space to let the two sheer engagement regions (26a) respectively of two hook end parts (26) engaged with the end (11a) of holder bracket (11), as seen from FIG. 4. Conversely, as will be explained, if the two hook end parts (26) are displaced from that engaged state to the narrow space between the two disengagement sections (32-2)(32-2) by forcibly rotating the headrest stay holder (12) in the bracket holder (10), then both hook end parts (26a) are sandwiched and squeezed together between the two disengagement section (32-2), thereby disengaging their respective sheer engagement regions (26a) from the bracket holder lower end (11a), as seen from FIG. 8.

Figure 8:
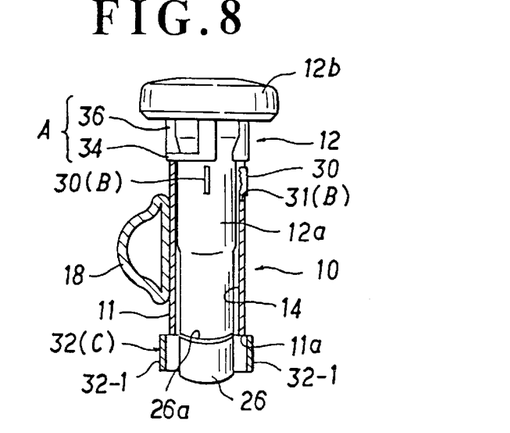
FIG. 8 is a partially sectioned side view of the first mode in the unlocked state.

According to this first mode, in a normal use, the headrest stay holder (12) is inserted and locked in the holder bracket (10), with its two sheer engagement regions (26a) being engaged over the lower end (11a) of holder bracket (10) at the two respective arcuate engagement areas (32-1)(32-1) of guide piece (32). Under this use state, the headrest stay (20) is inserted and retained in the thus-locked holder (12) so firmly as to support the headrest (22) upon the top of seat back (16), as in FIG. 1. Now, in disassembling the seat back (16), the headrest (22) is first removed from the headrest holder (12), and thereafter, a worker should depress the area of seat back upholding (a,b) surrounding the hole (O) so as to expose the previously stated non-circular force accessible area, i.e. the non-circular uneven projections (36)) of headrest stay holder (12), as shown in FIG. 12. Then, the worker attach the adjustable wrench (38), for instance, to that area or projections (36) and rotate the wrench (38) as indicated clockwise, by way of example, in FIG. 13. Simultaneous with this rotary operation, a great force of rotation is easily applied with a small force to the holder (12) and also to the stopper piece (30), as a result of which, the worker can easily give a great force overcoming the resistance of stopper piece (30) in the notch (31) to cause the piece (30) itself to be broken and cut off there, hence allowing both broken stopper piece (30) and headrest stay holder (12) to be displaced in further clockwise direction, by 90 degrees. FIG. 8 shows the state where the stopper piece (30) is cut off from the holder (12). This clockwise 90-degree rotation of the headrest stay holder (12) in turn rotates its two integral hook end parts (26)(26) to the narrow space between the two disengagement sections (32-2)(32-2), with the result that the hook end parts (26) are elastically moved toward each other via the elasticity of split end portion of headrest stay holder (12) itself, thereby releasing the associated two sheer engagement regions (26a) from engagement with the lower end (11a) of holder bracket (11), as observed from FIGS. 8 to 10. Thus, as indicated by the arrow in FIG. 9, the headrest stay holder (12) can be slid upwards in and along the inner wall (14) of holder bracket (10) and easily removed therefrom.

As shown in FIGS. 6 and 10, in the present mode, the two arcuate engagement areas (32-1)(32-1) also define a pair of engagement ranges (α1)(α1), each being indicative of an angle at which the worker may orient the headrest stay holder hook end parts (26)(26) for engagement with the bracket holder lower end (11a), whereas the two disengagement sections (32-2)(32-2) likewise define a pair of disengagement ranges (α2)(α2), each being indicative of an angle at which the worker may orient those hook end parts (26) to disengage their two respective sheer engagement regions (26a) from the bracket holder lower end (11a). Based on this generally quarterly divided ranges, a worker, although he or she does not see the guide piece (32), can readily perceive where to set the two hook end parts (26) of headrest stay holder (12) in reference to the engagement ranges (α1) when inserting the headrest stay holder (12) in the holder bracket (10), or can rotate the headrest stay holder (12) by 90 degrees to bring its two hook end parts (26) and sheer engagement regions (26a) to the disengagement ranges (α2) in order to remove the holder (12) from the holder bracket (10).

Figure 14:
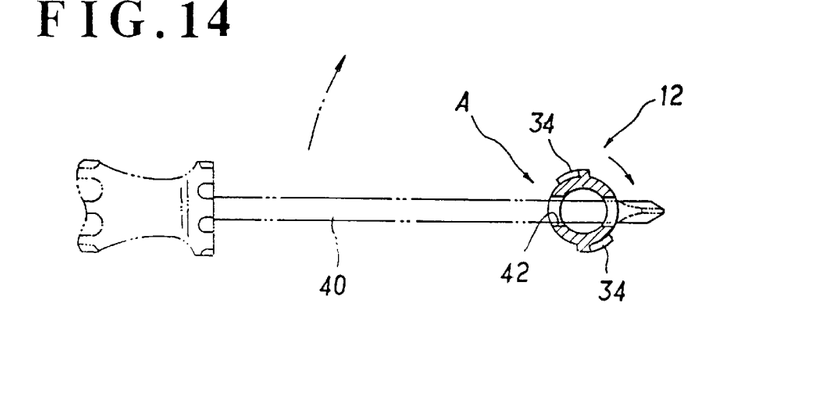
FIG. 14 is a diagram indicating a state where the headrest stay holder is rotated by a screwdriver to disengage it from the holder bracket.

The non-circular projection area at (34, 36) may be formed with a through-hole (42) therein, as suggested in FIG. 14, so that a long spindle portion of Phillips-type screwdriver (40) may be inserted in the through-hole (42) to give an amplified great force of rotation to the headrest stay holder (12), overcoming the resistance of stopper piece (30) in the notch (31).

The non-circular force accessible area at (34)(36) may be formed in any desired shape, as for example in a hexagonal shape, insofar as it is suited to be firmly gripped by the adjustable wrench (38) or pliers.

The disengagement guide means (C) is not limited to the above-described elongated circular shape of guide piece (32) in the first mode, but may be simply embodied by a pair of disengagement plates (32-2)(32-2), as shown in FIG. 15. In this case, such two disengagement plates (32-2)(32-2) are a non-distinctive substitute of the previously stated two disengagement sections of guide piece (32) of the first mode, which also provide a narrow space equal to or smaller than the inner diameter of bracket holder (10). In this mode, a pair of spaces (32-1)(32-1) are naturally defined on the opposite sides of the two disengagement plates (32-2). Those two spaces (32-1) are equivalent to the two arcuate disengagement areas of guide piece (32) of the first mode. It is therefore appreciated that, in normal use, the two hook end parts (26) of headrest stay holder (12) are located in the two respective spaces (32-1), allowing their associated two sheer engagement projections (26a) to be engaged with the lower end (11a) of holder bracket (10), and that, as likewise in the first mode, to rotate the headrest stay holder (12) by 90 degrees will bring its two integral hook end parts (26)(26) to the narrow space between the two disengagement plates (32-2), thereby causing the two hook end parts (26) to elastically move toward each other and thus releasing the two sheer engagement projections (26a) out of engagement with the lower end (11a) of holder bracket (11). Accordingly, the headrest stay holder (12) can be slid upwards in and along the inner wall (14) of holder bracket (10) and easily removed therefrom.

As suggested in FIGS. 16 and 17, the releasable rotation-preventive means (B) may be embodied by additionally forming a small notch area (31a) and a peripherally extending cut-away area (31b) to the notch (31) of holder bracket (10) of the first mode, while still using the stopper piece (30) identical in shape and size to that of the first mode. It is noted that this embodiment is based on the previously described arrangement of headrest stay holder (12) and holder bracket (10), and its whole and peripheral structures are basically identical thereto, only excepting such releasable rotation-preventive means (B). All like designations in this embodiment correspond to all like designations given in the first embodiment described above, and thus, repetition of description on the common or same elements and parts is deleted for the sake of simplicity. According to the present alternative mode illustrated in FIGS. 16 and 17, the notch (31), a part of the releasable rotation-preventive means (B), is only expanded in the circumferential direction of holder bracket (10) to define the cut-away area (b), in place of the vertically extending notch (31) of the first mode, with a slightly downwardly extending small notch area (13a) left at the lower edge thereof. The vertical whole length between the upper end of bracket holder (10) and the small notch area (13a) is slightly larger than the whole length of the stopper piece (30) such as to accommodate the lower end part of the stopper piece (30) therein, thereby retaining the same function of the first-mode notch (31) to engage the stopper piece (30) and prevent rotation of the headrest stay holder (12) in the holder bracket (11). As viewed from FIG. 16, as far as the illustrated mode is concerned, the cut-away area (31b) extends leftward along the peripheral wall of holder bracket (10) by 90 degrees relative to the central axis of the same bracket (10) and terminates in a vertical edge located at a point aligned with the disengagement section (32-2) of elongated circular guide piece (32). With this arrangement, in a normal use, as likewise in the first mode, the headrest stay holder (12) is locked in the holder bracket (10), with its two sheer engagement regions (26a) engaged with the lower end (11a) of holder bracket (10) at the two respective arcuate engagement areas (32-1)(32-1) of guide piece (32). Under this use state, the headrest stay (20) is retained in the thus-locked holder (12) so firmly as to support the headrest (22) upon the top of seat back (16), as in FIG. 1. As also likewise in the first mode, in the process of disassembling the seat back (16), the headrest (22) is first removed from the headrest holder (12), and thereafter, a worker should depress the area of seat back upholding (a,b) surrounding the hole (O) so as to expose the previously stated force accessible area, i.e. the non-circular uneven projections (36) of headrest stay holder (12), as shown in FIG. 12. Then, the worker attach the adjustable wrench (38), for instance, to that area or projection part (36) or insert the spindle portion of screwdriver (40) in the through-hole (42) in the same force accessible area (36) and rotate the wrench (38) or screwdriver (40) as indicated clockwise, by way of example, in FIG. 13 or 14. Simultaneous with this rotary operation, an amplified great force of rotation is easily applied with a small force to the holder (12) and also to the stopper piece (30), as indicated by the arrow ① in FIG. 17, with the result that the worker can easily give a great force overcoming the resistance of stopper piece (30) in the small notch area (31a), causing the piece (30) itself to be deformed there, and then, as observed in FIG. 17, the thus-deformed stopper piece (30) rides over the small notch area (31a) onto the cut-away area (31b) as the headrest stay holder (12) continues to be rotated clockwise in the direction of arrow ① by the worker. In this way, both deformed stopper piece (30) and headrest stay holder (12) are displaced in further clockwise direction, by 90 degrees. This clockwise 90-degree rotation of the headrest stay holder (12) in turn rotates the two hook end parts (26) to the narrow space between the two disengagement sections (32-2), with the result that the hook end parts (26) are elastically moved toward each other, thereby releasing their two respective sheer engagement regions (26a) from engagement with the lower end (11a) of holder bracket (11), as understandable in FIG. 17. Thus, as indicated by the arrow ②, the headrest stay holder (12) can be slid upwards in and along the inner wall (14) of holder bracket (10) and easily removed therefrom.

In the present second embodiment, the rotation of headrest stay holder (12) relative to the bracket holder (10) is limited to the clockwise 90-degree rotation within the range between the two vertical edges respectively of the notch (31) and cut-away area (31b), and therefore, a worker can easily perceive such rotation range by trying to rotate the headrest stay holder (12) several times clockwise and anticlockwise via the wrench (38) or screwdriver (40) and feel the opening direction of the cut-away area (31b), i.e. the leftward direction, in advance before applying a great leftward force of rotation to the headrest stay holder (12) enough to deform the stopper piece (30).

It is noted in this second mode, that the stopper piece (30) may preferably be formed from a synthetic resin material of a certain rigid yet elastic property such as to resist a normal force or load exerted through the stays of headrest (22), while permitting it not only to be elastically deformable by the afore-stated great force of rotation, but also to elastically recover from the deformed state into its original linear shape. In this instance, the headrest stay holder (12), after having been removed from the holder bracket (10) can be directly reused for insertion into the holder bracket (10) or another fresh holder bracket. With regard to the cut-away area (31b), it may be so formed as to extend rightward, not leftward as shown, from the notch (31) along the peripheral wall of holder bracket (10).

Referring now to FIGS. 18 to 26, there is another third alternative embodiment in accordance with the present invention. In this mode, the basic structure of both headrest stay holder (12) and bracket holder (10) as well as the force accessible means (A) and releasable rotation-preventive means (B) are identical to those of the above-described first and second modes, only excepting the disengagement guide means (C). Thus, all like designations to be given here correspond to all like designations in the first mode and any further description is deleted on the same elements with those of the first mode for the sake of simplicity.

Figure 18:
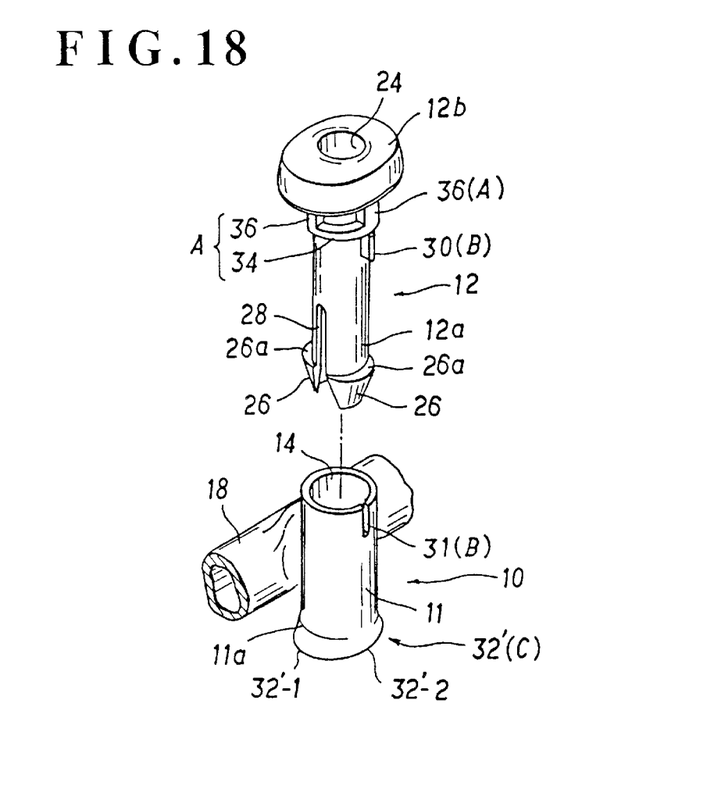
FIG. 18 is a partly broken, schematic perspective view showing a third alternative mode of the arrangement.
Figure 19:
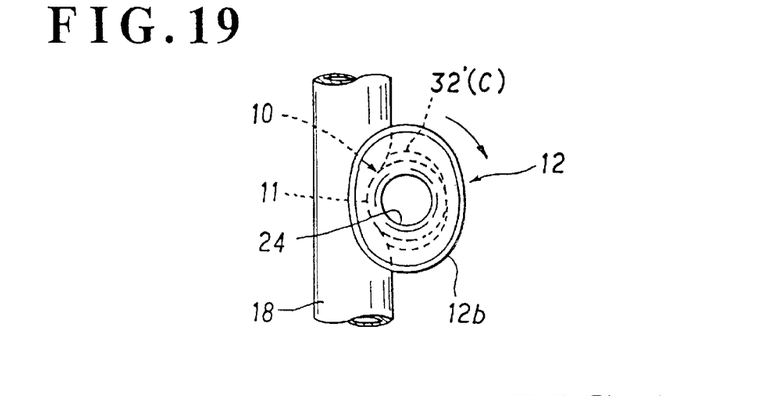
FIG. 19 is a partly broken plan view of the third mode of arrangement in accordance with the present invention, which shows a locked state where the headrest stay holder is engaged with the holder bracket.
Figure 20:
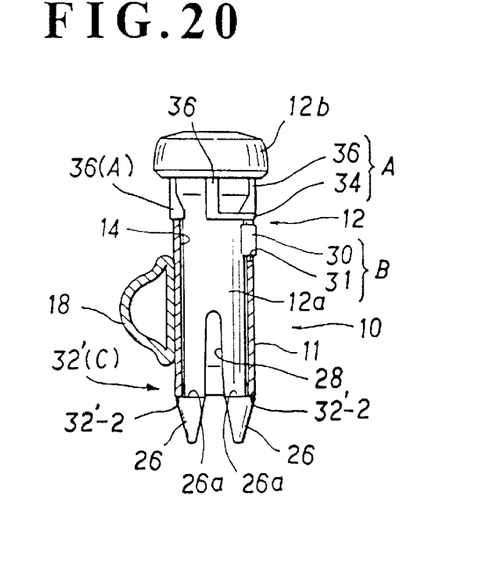
FIG. 20 is a partially sectioned side view of the third mode of arrangement in the locked state.
Figure 21:
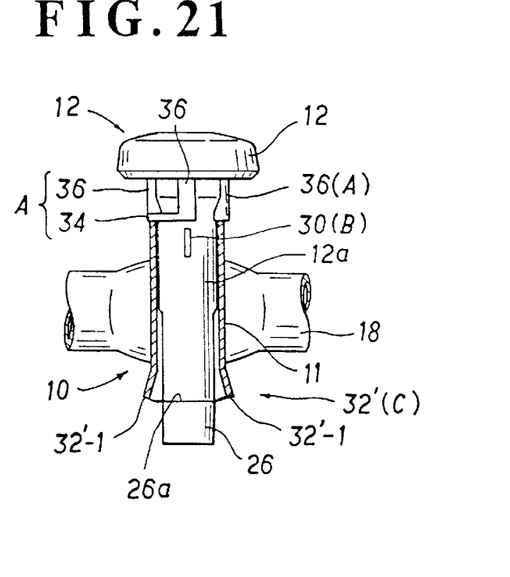
FIG. 21 is a partially sectioned front view of the third mode in the locked state.

The disengagement guide means (C) is embodied by a generally elongated skirt guide portion (32') formed integrally with the lower end (11a) of holder bracket (10), as an equivalent to the generally elongated circular guide piece (32) of the first mode. In other words, the skirt portion (32') comprises a pair of downwardly diverging disengagement sections (32'-2)(32'-2), as an alternative to the pair of disengagement sections (32-2)(32-2) of the first mode; and a pair of rectilinearly extending engagement sections (32'-2) (32'-2) as an alternative to the pair of arcuate engagement areas (32-1)(32-1) of the first mode. In this embodiment, the two downwardly diverging disengagement sections (32'-1) (32'-1) face toward each other along the major-axis direction of the elongated circular guide skirt portion (32'), extending along and in parallel with the seat back frame (18). Those disengagement sections (32'-1) provide a space larger than the outer diameter of both two crescent-shaped sheer engagement regions (26a) of headrest stay holder (12). On the other hand, the two engagement sections (32'-2)(32'-2) are opposite to each other in the minor-axis direction of the same elongated circular skirt portion (32'), orienting in a direction intersecting the longitudinal axis of the seat back frame (18). Those engagement sections (32'-2) provide a space equal to or slightly smaller than the outer diameter of the tubular body (12a) of headrest stay holder (12). This arrangement is angularly contrast to (changed its orientation by 90 degrees with respect to) that of the guide piece (32) in the first mode, but it is a matter of choice since the corresponding portions (32-1)(32-2) of that first-mode guide piece (32) may be easily designed in such angulary changed manner, if necessary.

According to this third mode, in a normal use, the headrest stay holder (12) is locked in the holder bracket (10), with its two hook end parts (26)(26) being elastically contracted between the two respective engagement sections (32'-1)(32'-1) of guide skirt portion (32') so as to positively engage the sheer engagement regions (26a) therewith. Under this use state, the headrest stay (20) is retained in the thus-locked holder (12) so firmly as to support the headrest (22) upon the top of seat back (16), as in FIG. 1. In the process of diassembling the seat back (16), after having removed the headrest (22) from the headrest holder (12), a worker should depress the area of seat back upholding (a,b) surrounding the hole (O) to expose the previously stated non-circular force accessible area, i.e. the non-circular uneven projections (36) of headrest stay holder (12), as shown in FIG. 12. Then, the worker attach the adjustable wrench (38) or screwdriver (40) to that area (36 or 42) and rotate the same as indicated clockwise, by way of example, in FIGS. 13 and 14. Simultaneous with this rotary operation, an amplified great force of rotation is easily applied with a small force to the holder (12) and also to the stopper piece (30), as a result of which, the worker can easily give a great force overcoming the resistance of stopper piece (30) in the notch (31) to cause the piece (30) itself to be broken and cut off there as in FIG. 8, hence allowing both broken stopper piece (30) and headrest stay holder (12) to be displaced in further clockwise direction, by 90 degrees. This clockwise 90-degree rotation of the headrest stay holder (12) in turn rotates its two integral hook end parts (26)(26) toward the wide space between the two disengagement sections (32'-1)(32'-1), with the result that the two hook end parts (26) are released from the contracted state, elastically recovering its outwardly expanded original state, whereupon the two sheer engagement regions (26a) are disengaged from the respective engagement sections (32'-2) of guide skirt portion (32'), as observed from FIGS. 19 to 26. Thus, upon pulling the headrest stay holder (12) upwards from the holder bracket (10), its two hook end parts (26) are slid upwards along the smooth sloped or curved inner surfaces of guide skirt portion (32') so that the whole holder (12) are easily removed from the holder bracket (10).

Figure 22:
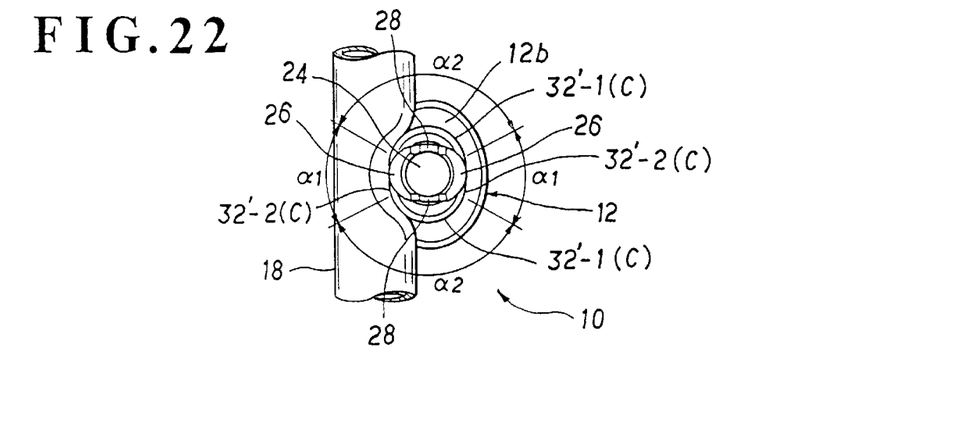
FIG. 22 is a partly broken bottom view of the third mode in the locked state.
Figure 23:
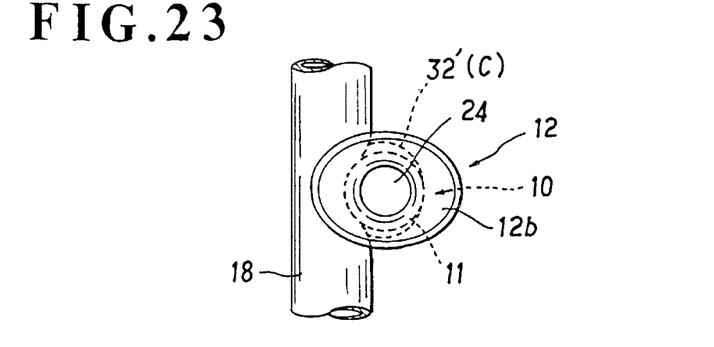
FIG. 23 is a partially sectioned plan view of the third mode, which shows an unlocked state where the headrest stay holder is disengaged from the holder bracket.
Figure 24:
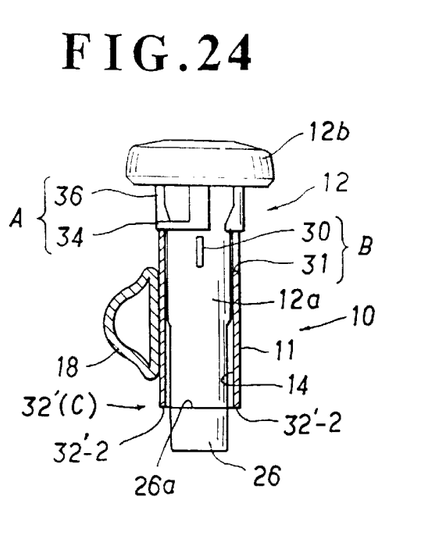
FIG. 24 is a partially sectioned side view of the third mode in the unlocked state.
Figure 25:
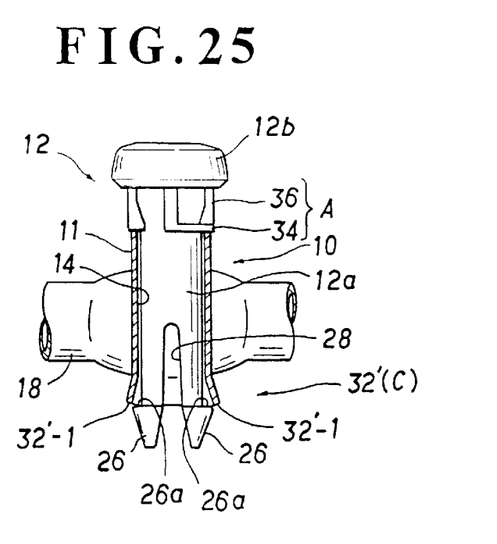
FIG. 25 is a partially sectioned front view of the third mode in the unlocked state.

As shown in FIGS. 22 and 26, in the present mode, the two engagement sections (32'-2) also define a pair of engagement ranges (α1) (α1), each being indicative of an angle at which the worker may orient the headrest stay holder hook end parts (26)(26) to engage the two sheer engagement regions (26a) with the respective engagement sections (32'-2), whereas the two disengagement sections (32'-1)(32'-1) likewise define a pair of disengagement ranges (α2)(α2), each being indicative of an angle at which the worker may orient those hook end parts (26) for disengagement of the two sheer engagement regions (26a) from the respective engagement sections (32'-1). As likewise in the first mode, based on this generally quarterly divided ranges, a worker, although he or she does not see the guide piece (32), can readily perceive where to set the two hook end parts (26) of headrest stay holder (12) in reference to the engagement ranges (α1) when inserting the headrest stay holder (12) in the holder bracket (10), or can rotate the headrest stay holder (12) by 90 degrees to bring its two hook end parts (26) to the disengagement ranges (α2) in order to remove the holder (12) from the holder bracket (10).

FIGS. 27 to 29 illustrate an alternative fourth embodiment of the present invention. According thereto, the headrest stay holder (12) and bracket holder (10) themselves are basically identical to those of the previously stated first mode, and so is the force accessible means (A) (i.e. the non-circular projections (34)(36) as in FIG. 2). The releasable rotation-preventive means (B) and disengagement guide means (C) are only exception in the present mode. Thus, all like designations in this mode correspond to all like designations given in the first mode and any further description is deleted on the same elements with the first mode.

Namely, the releasable rotation-preventive means (B) may be embodied by a downwardly extending stopper piece (30) and a generally upwardly diverging upper engagement notch (31) as seen in FIG. 27. The downwardly extending stopper piece (30) serves as an equivalent to that of the first mode, only except that the former is of an increased thickness and rigidity relative to the latter. Likewise in the first mode, the stopper piece (30) is formed from the same synthetic resin material with that of the headrest stay holder (12). In the present embodiment, however, the stopper piece (30) is shown in FIG. 12 to be arranged integrally on the headrest stay holder body portion (12a) such as to be disposed in alignment with the longitudinal direction in which the slit-like notch (28) extends. On the other hand, the generally upwardly diverging stopper engagement notch (31) may be defined only by forming a pair of outwardly sloped edges (31b) (31b) in the upper part of the stopper engagement notch (31) of the first mode stated earlier, while leaving the lower end part of that first-mode notch (31) as a relatively small notch area (31a). Hence, the pair of sloped edges (31b)(31b) diverges symmetrically from and relative to the notch area (31a). As will be explained later, in a normal use, the stopper piece (30) is engaged in the notch area (31a) to prevent accidental or unintentional rotation of the headrest stay holder (12) in the holder bracket (10), but if a great force of rotation is applied via the adjustable wrench (38) or screwdriver (40) to the headrest stay holder (12), the stopper piece (30) rides over one of the two angled parts (R) and slides upwardly along the sloped edge (31b) so that the stopper piece (30) is bodily released from engagement with the notch (31).

The disengagement guide means (C) in the present mode may be embodied by the circular original lower end (11a) of bracket holder (10), the two crescent-like sheer engagement regions (26a) associated with the headrest stay holder (12) and the two angled parts (R)(R) defined in the foregoing stopper engagement notch (31). Namely, these inherent portions of holder and bracket (12)(10) are utilized in the aggregate in this particular mode, taking into account the force of rotation applied to the headrest stay holder (12) as a source of force to disengage its hook end parts (26) from the holder holder (10). According to the present embodiment, from the broad concept viewpoint, when a great force of rotation is applied to the holder (12) via the force accessible means (A) (i.e. the non-circular projections (34 36) or the through-hole (42)) enough to cause the stopper piece (30) to ride over one of the two angled parts (R) from the notch area (31a), the foregoing elements of disengagement guide means (C) cooperate with one another to transform such rotation force into a force for guiding the headrest stay holder (12) upwardly in and along the inner wall (14) of holder bracket (10), while contracting the two hook end parts (26) of headrest stay holder (12) toward each other to release their respective two sheer engagement regions (26a) from engagement with the lower end (11a) of holder bracket (10). In brief, as likewise in the first mode where both two hook end parts (26) are forcibly contracted by the guide piece (32) with rotation of the headrest stay holder (12), the present fourth mode is of such an arrangement that, upon applying a great force of rotation to the holder (12), all the aforementioned angled part (R), crescent-shaped sheer engagement regions (26a) and lower end (11a), coact in response to the rotation of holder (12) so as to forcibly contract both two hook end parts (26a) and guide them into the inside of bracket holder (11).

Specifically, as shown in FIG. 27, in contrast to the previously described embodiments, the headrest stay holder (12) is inserted in the holder bracket (10) such that its two hook end parts (26) are oriented in a direction extending along the longitudinal direction of the seat back frame (18) while its two slit-like notches (28) are oriented in a direction intersecting the longitudinal axis of the same seat back frame (18). This is because both stopper piece (30) and notches (28) should be aligned with the notch area (31a) of upwardly diverging notch (31), as in FIG. 27, to insert and set the holder (12) in position within the bracket (10), and also because the force of rotation can be transmitted more efficiently as a force for contracting the two hook end parts (26) via the foregoing disengagement guide elements (11a, 26a, R), as will be understood more concretely below.

Referring now to FIGS. 28 and 29, in a normal use, the stopper piece (30) at the headrest stay holder (12) is engaged in the relatively small notch area (31a) at the holder bracket (10) to thereby prevent rotation of the holder (12) in the bracket (10). Under this use state, when a worker applies a great clockwise force of rotation to the headrest stay holder (12) via the adjustable wrench (38) or screwdriver (40) and the force accessible area (34, 36) as likewise in the first mode, the stopper piece (30) is caused to ride over the angled part (R) and pulled upwardly away from the notch area (31a). At this point, dynamically, as indicted in FIG. 28, due to the force of rotation (P) applied from a worker, the stopper piece (30) receives an upward force component (W) as it is strongly abutted against the angled part (R). In other words, the stopper piece (30) is forcibly abutted against the angled part (R) and then introduced in the upward direction, relative to the angled part (R), towards the sloped edge (31b), the angle part (R) therefore acting as a fulcrum to the stopper piece (30). At this moment, such forcible upward introduction of the stopper piece (30) relative to the angle part (R)

simultaneously creates two contact points (x)(y) between the holder (12) and bracket (10). Precisely stated in this respect, as viewed from FIG. 28, when the great force of rotation (P) is applied to the headrest holder (12) clockwise, the left-side edge of stopper piece (30) is strongly contacted with the angled part (R) at (x). At this moment, although not shown, an upwardly slant force component is created leftwards in the stopper piece (30) at that contact point (x), which in turn creates the upward force component (W). Such dynamic action simultaneously occurs at the point of contact (y) between the headrest stay holder lower end (11a) and crescent-shaped engagement region (26a) of right-side hook end part (26), wherein the same amount of upwardly slant force is exerted between those lower end (11a) and engagement region (26a), creating the same amount of upward force component (W) there. As a result, a resistance (N') is produced from the two contact points (x)(y) and therefore, in view of the above-noted upwardly slant force component, a worker may apply the clockwise rotation force (P) an amount overcoming that resistance (N'). In this case, since the contact point (x), i.e. a fulcrum point (at R) to the stopper piece (30), is positioned distant from the contact point (y) in a torsional relation therewith, an angular moment is produced by the rotation force (P) to the body of headrest stay holder (12) in the leftward direction so as to produce and apply an inward force component (W') to the right-side hook end part (26) as shown in FIG. 28. Thus, the stopper piece (30) is caused to move in the leftward and upwardly slant direction relative to the angled part (R) and at the same time, the right-side hook end part (26) is elastically warped in the direction inwardly thereof. Then, referring to FIG. 29, as the clockwise rotation force continues to be applied to the headrest stay holder (12), the stopper piece (30) enters the left-side space of upwardly diverging cut-away area (at 31) and is allowed to be displaced leftward, which releases the stopper piece (30) itself from engagement with the notch area (31a). Hence, the stopper piece (30) is slid upwardly along the sloped edge (31b), while simultaneously the two hook end parts (26) are guided by the sliding of their associated crescent-shaped engagement regions (26a) along the circular bracket holder lower end (11a) and caused to enter the inside of bracket holder (10). It is seen here that the tapered areas (26a-1) respectively of the two crescent-shaped engagement regions (26a) act as a more smooth guide along the circular bracket holder lower end (11a) to facilitate insertion of both two hook end parts (26) into within the bracket holder (10). Preferably, each of those engagement regions (26a) may be formed to have a sloped or cambered surface, as best seen from FIG. 28, in order to facilitate the ease with which the respective hook end parts (26) can be guided along and disengaged from the holder bracket lower end (11a).

In this particular mode, it is thus appreciated that the foregoing angled part (R), crescent-shaped engagement region (26a) and lower end (11a) cooperate with one another to effectively guide the hook end parts (26) of headrest stay holder (12) and disengage them from the bracket holder lower end (11a), as an equivalent to the previously stated guide piece (32) of first embodiment. Accordingly, with the clockwise rotation of headrest stay holder (12), both two hook end parts (26a) are elastically contracted toward each other and inserted into the bracket holder (10), allowing the headrest stay holder (12) to be bodily slid upwardly along the inner wall (14) of bracket holder (10) and easily removed therefrom. In the present mode, the sloped edge (31b) also serves as an auxiliary guide means for guiding the stopper piece (30) in the upward direction to assist in giving the upward force component (W) to the headrest stay holder (12). Of course, in this mode, the engagement notch (31) may be formed by expanding such rectangular cut-away area (at 31a) as in FIG. 16 in relation to the lower notch area (31a) in place of the upwardly diverging cut-away area (31). In this case, a worker should first apply a rotation force enough to cause the stopper piece (30) to ride over the angled part (R) so as to contract and insert both two hook end parts (26) into the holder bracket (10) and then apply an upwardly force to the thus-unlocked headrest stay holder (12) to pull up and remove the holder (12) from the bracket holder (10), just as likewise in the first to third modes. The stopper piece (30) may be of a deformable property as likewise in the second mode so that it can be deformed by applying a great force of rotation thereto via the wrench (38) or screwdriver (40). In the present fourth mode, needless to mention, the headrest stay holder (12) can be rotated anti-clockwise in the same steps as above to disengage the two hook end parts (26) from the holder bracket (10) and release the holder (12) itself therefrom.

It is noted in any of the above-described modes that instead of using the force accessible means (i.e. the non-circular projections (34, 36)), the head portion (12b) of headrest stay holder (12) may be increased in dimension in the illustrated generally elliptic shape to such a degree that a worker can directly rotate the head portion (12b) without the wrench (38) or screwdriver (40) to apply an amplified great force of rotation to the holder (12) sufficient to overcome the resistance of stopper piece (30) in the notch (31) or notch area (31a) to cause rotation of the headrest stay holder (12) in the holder bracket (10).

From the descriptions above, in accordance with the present invention, it is appreciated that quite simplified arrangements are applicable to the conventional headrest stay holder and holder bracket, without any complicated expensive improvements or changes effected therein and that, in disassembling the seat back (16), a worker can use the adjustable wrench (38) or screwdriver (40) to easily apply a great force of rotation via the force accessible means (e.g. the non-circular projections (34, 36) or the through-hole (42)) to the headrest stay holder (12) so that the holder (12) can be easily removed from the holder bracket (10) by virtue of the above-described releasable rotation-preventive means (B) and disengagement guide means (C), without need for tearing or opening a local area of upholstery layers of seat back (16) or seat for access to the hook end parts (26a) of headrest stay holder (12) as found in the conventional seat disassembling processes. Thus, the present invention eliminates a danger and fatigue on the worker's side and contributes greatly to the speed-up of all operations and flows of steps for seat disassembling processes.

While having described the present invention thus far, it should be understood that the invention is not limited to the illustrated embodiments, but any other modifications additions and replacements may be structurally applied thereto without departing from the scopes of the appended claims. For instance, the holder bracket (10) may be of a generally channel shape in cross-section, instead of the tubular body shown in the figures. In this case, the space in the channel cross-section of holder bracket should be of such a size that allows slidable insertion therein of the split lower portion of headrest stay holder (12), with its lower U-shaped end portion serving as the disengagement guide means (C) and any one of the above-suggested modes of force accessible means (A) and releasable rotation-preventive means (B) are provided in the headrest stay holder and holder bracket, as well.

What is claimed is:

1. In a combination of headrest stay holder and holder bracket, which is for use with a vehicle seat, wherein said holder bracket is to be fixedly provided in said vehicle seat and said headrest stay holder is removably supported in said holder bracket, said headrest stay holder being of such type that includes a generally tubular body for receiving a stay of a headrest therein and an elastic split lower end portion having, formed therein, a pair of slit-like notches and a pair of hook-like end parts, and wherein said headrest stay holder is normally locked in said holder bracket, with said pair of hook-like end parts thereof engaged with an engagement end portion of the holder bracket, but removable therefrom by contracting said pair of hook-like end parts elastically to a size smaller than that of said holder bracket for disengagement therefrom, an arrangement comprising:

a force accessible means for making accessible a force of rotation to said headrest stay holder and allowing said force of rotation to be applied thereto in an amplified way, said force accessible means being defined in said headrest stay holder;

a releasable rotation-preventive means which normally provides a resistance between said headrest stay holder and holder bracket so as to provide a rotation-preventive action for preventing the headrest stay holder against rotation in and relative to the holder bracket, but permits the releasable rotation-preventive means per se to be released from said rotation-preventive action by application of said force of rotation thereto sufficient to overcome said resistance via said force accessible means, said rotation-preventive means being defined between said headrest stay holder and holder bracket; and a disengagement guide means by which said pair of hook-like end parts of said headrest stay holder may be so guided as to be elastically contracted to a size smaller than said holder bracket and displaced in a direction out of engagement with said engagement end portion of said holder bracket as said headrest stay holder is rotated in said holder bracket by said force of rotation, wherein, when said force of rotation is applied via said force accessible means to said headrest stay holder sufficient to overcome said resistance of said releasable rotation-preventive means, said headrest stay holder is rotated in said holder bracket, with said releasable rotation-preventive means being released from said rotation-preventive action, so that continued rotation of said headrest stay holder under said force of rotation by a predetermined degree of angle relative to said holder bracket causes elastic contraction of said pair of hook-like end parts of the headrest stay holder for entry into said holder bracket via said disengagement guide means and also causes simultaneous displacement, via said disengagement guide means, of the same pair of hook-like end parts out of engagement with said engagement end portion of said holder bracket, thus allowing the headrest stay holder to be removed from the holder bracket.

2. The arrangement as defined in claim 1, wherein said headrest stay holder has an upper end portion, wherein, when said holder bracket is fixedly provided in said vehicle seat, and also with said headrest stay holder supported in the holder bracket thus provided in the vehicle seat, said upper end portion of the headrest bracket is disposed adjacent a top of said vehicle seat, and wherein said force accessible means is defined in said upper end portion of headrest stay holder, so that said force of rotation may be readily applied from outside of said vehicle seat to said headrest stay holder, and wherein, upon the force of rotation applied at said upper end portion of headrest stay holder via said force accessible means to said headrest stay holder, sufficient to overcome said resistance, the releasable rotation-preventive means per se is released from said rotation-preventive action so as to disengage said pair of hook end parts of the headrest stay holder via said disengagement guide means from said engagement end portion of said holder bracket, whereby the headrest stay holder is removed from said holder bracket.

3. The arrangement according to claim 2, wherein said force accessible means comprises a non-circular portion formed in said upper end portion of said headrest stay holder, said non-circular portion being of a shape suited to be gripped firmly by a tool of type capable of gripping said non-circular portion and applying an amplified force of rotation via said non-circular portion to said headrest stay holder, and wherein, by having said non-circular portion gripped by said tool and rotating the tool by said predetermined degree of angle relative to said headrest stay holder, the amplified force of rotation is applied via said non-circular portion to said headrest stay holder, sufficient to overcome said resistance, thereby releasing said releasable rotation-preventive means from said rotation-preventive action so as to disengage said pair of hook end parts of the headrest stay holder via said disengagement guide means from said engagement end portion of said holder bracket, whereby the headrest stay holder is removed from said holder bracket.

4. The arrangement according to claim 2, wherein said force accessible means comprises a through-hole formed in said upper end portion of said headrest stay holder, said through-hole penetrating therein in a direction orthogonal with a central axis of said headrest stay holder and permitting a tool having a long spindle portion to be inserted therein, and wherein, by inserting the long spindle portion of said tool in said through-hole and rotating the same, the amplified force of rotation is applied to said headrest stay holder sufficient to overcome said resistance, thereby releasing said releasable rotation preventive means from said rotation-preventive action so as to disengage said pair of hook end parts of the headrest stay holder via said disengagement guide means from said engagement end portion of said holder bracket, whereby the headrest stay holder is removed from said holder bracket.

5. The arrangement as defined in claim 1, wherein said releasable rotation-preventive means includes: a stopper means provided in said headrest stay holder; and a notch means provided in said holder bracket, in such a manner that said stopper means is normally engaged with said notch means, with said resistance, such as to prevent rotation of said headrest stay holder in said holder bracket, but releasable from engagement with said notch means by application of said force of rotation via said force accessible means to said headrest stay holder sufficient to overcome said resistance.

6. The arrangement according to claim 5, wherein said stopper means is of a deformable property relative to said notch means such as to be deformed by said application of the force of rotation via said force accessible means to said headrest stay holder and displaced out of engagement with the notch means as the headrest stay holder is rotated in the holder bracket by the force of rotation.

7. The arrangement according to claim 6, wherein said stopper means comprises a stopper piece having said deformable property, wherein said notch means comprises a notch of a size slightly greater than said stopper piece such as to receive and engage the latter therein, and wherein said stopper piece is deformable relative to said notch such that, upon said force of rotation applied via said force accessible means to said headrest stay holder, the stopper piece is deformed against said notch to such a degree as to be broken and cut off at the notch, to thereby be displaced out of engagement therewith with rotation of the headrest stay holder.

8. The arrangement according to claim 6, wherein said stopper means comprises a stopper piece having said deformable property, wherein said notch means comprises a notch of a size slightly greater than said stopper piece such as to receive and engage the latter therein, a peripherally extending notch area which is formed in and from said notch in a direction peripherally of said headrest stay holder, with a lower end portion of said notch left therein, and a downwardly extending notch area defined by said lower end portion of notch, and wherein said stopper piece is deformable relative to said notch means, such that, upon said force of rotation applied via said force accessible means to said headrest stay holder, the stopper piece is deformed thereby against said notch to such a degree as to ride over said downwardly extending notch area, to thereby be displaced out of engagement therewith with rotation of the headrest stay holder.

9. The arrangement according to claim 8, wherein said peripherally extending notch area is so formed in said holder bracket as to extend in an upwardly diverging way from and relative to said downwardly extending notch area, and wherein said stopper piece is deformable relative to said notch means such that, upon said force of rotation applied via said force accessible means to said headrest stay holder, the stopper piece is deformed against said notch to such a degree as to ride over said downwardly extending notch area, to thereby be displaced out of engagement therewith with rotation of the headrest stay holder.

10. The arrangement according to claim 1, wherein said headrest stay holder has a head portion formed at the upper end thereof, said head portion being great in diameter relative to the tubular body portion of the same headrest stay holder, to such a degree that said force of rotation may be applied via said head portion in the amplified way to said headrest stay holder, and wherein said force accessible means comprises said head portion such that the rotation of force may be directly accessed and applied to the head portion from a hand of a worker.

11. The arrangement as defined claim 1, wherein said disengagement guide means includes: a first means for causing said pair of hook-like end parts to be elastically contracted to a size smaller than the holder bracket and guiding said pair of hook-like end parts in a direction out of engagement with the engagement end portion of said holder bracket when said force of rotation is applied via said force accessible means to the headrest stay holder by said predetermined degree of angle, sufficient to overcome the resistance of said releasable rotation-preventive means; and a second means for allowing said pair of hook-like end parts of said headrest stay holder to be engaged with the engagement end portion of said holder bracket when said headrest stay holder is normally secured in said holder bracket.

12. The arrangement according to claim 11, wherein said disengagement guide means comprises a guide member of a generally elongated circular shape, which is fixed to said engagement end portion of said holder bracket, and wherein said guide member includes: a pair of generally rectilinear sections as said first means, in which pair of generally rectilinear sections, said pair of hook-like end parts are caused to be elastically contracted to a size smaller than the holder bracket and guided in a direction out of engagement with the engagement end portion of said holder bracket when said force of rotation is applied via said force accessible means to the headrest stay holder by said predetermined degree of angle, sufficient to overcome the resistance of said releasable rotation-preventive means; and a pair of generally arcuate sections as said second means, in which pair of generally arcuate sections, said pair of hook-like end parts of said headrest stay holder are respectively allowed to be engaged with said engagement end portion of said holder bracket.

13. The arrangement according to claim 11, wherein said disengagement guide means comprises: a pair of guide plates as said first means; and a pair of spaces as said second means, said spaces being defined on opposite sides of said pair of guide plates, wherein said pair of guide plates are fixed to said engagement end portion of said holder bracket in a mutually faced relation with each other, in which said pair of guide plates said pair of hook-like end parts of said headrest stay holder are caused to be elastically contracted to a size smaller than the holder bracket and guided in a direction out of engagement with the engagement end portion of said holder bracket when said force of rotation is applied via said force accessible means to the headrest stay holder by said predetermined degree of angle, sufficient to overcome the resistance of said releasable rotation-preventive means, and wherein said pair of spaces each allows the respective said pair of hook-like end parts to be engaged with said engagement end portion of said holder bracket.

14. The arrangement according to claim 11, wherein said releasable rotation-preventive means includes a stopper means provided in said headrest stay holder and a notch means provided in said holder bracket, wherein said notch means comprises a peripherally extending notch formed in a direction peripherally of the holder bracket holder and a downwardly extending notch area defined along a longitudinal direction of the holder bracket from said peripherally extending notch, said downwardly extending notch area being of a size slightly greater than said stopper means such as to receive and engage the latter therein, wherein said first means of said disengagement guide means comprises: a fulcrum point active to said stopper means, said fulcrum point being defined between said peripherally extending notch and downwardly extending notch area; an angular moment applying point which is active to one of said pair of hook-like end parts of said headrest stay holder; and a disengagement guide point where said pair of hook-like end parts of said headrest stay holder are guided and disengaged from said engagement end portion of said holder bracket, said disengagement guide point being defined between said pair of hook-like end parts and said engagement end portion such as to allow smooth sliding and guiding of the pair of hook-like end parts along the engagement end portion into within said holder bracket, wherein said fulcrum point is located in a torsional relation with said angular moment applying point, and wherein, when said stopper means is forcibly abutted against said fulcrum point and displaced upwardly relative to said fulcrum point, out of engagement with said downwardly extending notch area, by application of said force of rotation to said headrest stay holder, said angular moment applying point is created between said one of said pair of hook-like end parts and said engagement end portion of said holder bracket, whereby an inward force component is produced and applied to said one of said pair of hook-like end parts, thereby contracting it inwardly of said headrest stay holder out of engagement with said engagement end portion of the holder bracket, which in turn guides both said pair of hook-like end parts, via said disengagement guide point, into within said holder bracket.

15. The arrangement according to claim 14, wherein said fulcrum point is an angled part defined between said peripherally extending notch area and said downwardly extending notch area, wherein said headrest stay holder further includes a sheer engagement region defined in each of said pair of hook-like end parts thereof, wherein said holder bracket further includes a circular end defined along said engagement end portion thereof, and wherein said circular end and sheer engagement region cooperate with each other to define said disengagement guide point, providing a sliding guide plane along which both said pair of hook-like end parts of the headrest stay holder may be slid in a direction out of engagement with said engagement portion toward inside of said holder bracket.

16. The arrangement according to claim 15, wherein said peripherally extending notch area is formed in an upwardly diverging fashion from and relative to said downwardly extending notch area, whereupon a pair of said angled part are defined between said the thus-upward-divergently formed notch and downwardly extending notch area.

17. The arrangement according to claim 15, wherein said sheer engagement region has a sloped or cambered surface defined thereon.

18. The arrangement according to claim 17, wherein said sheer engagement region is of a generally crescent shape, having a pair of tapered areas formed therein.

19. In a combination of headrest stay holder and holder bracket, with a vehicle seat having an elastic upholstery covered therewith and a hole formed in the elastic upholstery, wherein said holder bracket is disposed in said vehicle seat, with an upper end portion thereof located adjacent said hole in said elastic upholstery, wherein said headrest stay holder is removably supported in said holder bracket such that an upper end portion of the headrest stay holder is disposed in said hole, said headrest stay holder being of such type that includes a generally tubular body for receiving a stay of a headrest therein and an elastic split lower end portion having, formed therein, a pair of slit-like notches and a pair of hook-like end parts, and wherein said headrest stay holder is normally locked in said holder bracket, with said pair of hook-like end parts thereof engaged with an engagement end portion of the holder bracket, but removable therefrom by contracting said pair of hook-like end parts elastically to a size smaller than that of said holder bracket for disengagement therefrom, an arrangement comprising:

a force accessible means for making accessible a force of rotation to said headrest stay holder and allowing said force of rotation to be applied thereto in an amplified way, said force accessible means being defined in said upper end portion of said headrest stay holder;

a releasable rotation-preventive means which normally provides a resistance between said headrest stay holder and holder bracket so as to provide a rotation-preventive action for preventing the headrest stay holder against rotation in and relative to the holder bracket, but permits the releasable rotation-preventive means per se to be released from said rotation-preventive action by application of said force of rotation thereto sufficient to overcome said resistance via said force accessible means, said rotation-preventive means being defined between said headrest stay holder and holder bracket; and a disengagement guide means by which said hook-like end part of said headrest stay holder may be so guided as to be elastically contracted to a size smaller than that of said holder bracket and displaced in a direction out of engagement with said engagement end portion of said holder bracket as said headrest stay holder is rotated in said holder bracket by said force of rotation, wherein, by depressing an area of said elastic upholstery that surrounds said hole, said force accessible means is exposed from said vehicle seat, and then, when said force of rotation is applied via said force accessible means to said headrest stay holder, sufficient to overcome said resistance of said releasable rotation-preventive means, said headrest stay holder is rotated in said holder bracket, with said releasable rotation-preventive means being released from said rotation-preventive action, so that continued rotation of said headrest stay holder under said force of rotation by a predetermined degree of angle relative to said holder bracket causes elastic contraction of said pair of hook-like end parts of the headrest stay holder for entry into said holder bracket via said disengagement guide means and also causes simultaneous displacement, via said disengagement guide means, of the same pair of hook-like end parts out of engagement with said engagement end portion of said holder bracket, thus allowing the headrest stay holder to be removed from the holder bracket.

* * * * *